Aug. 30, 1955     L. E. JOHNSON     2,716,396
ARRANGEMENT OF MANIFOLDS ON INTERNAL COMBUSTION ENGINES
Filed March 31, 1954
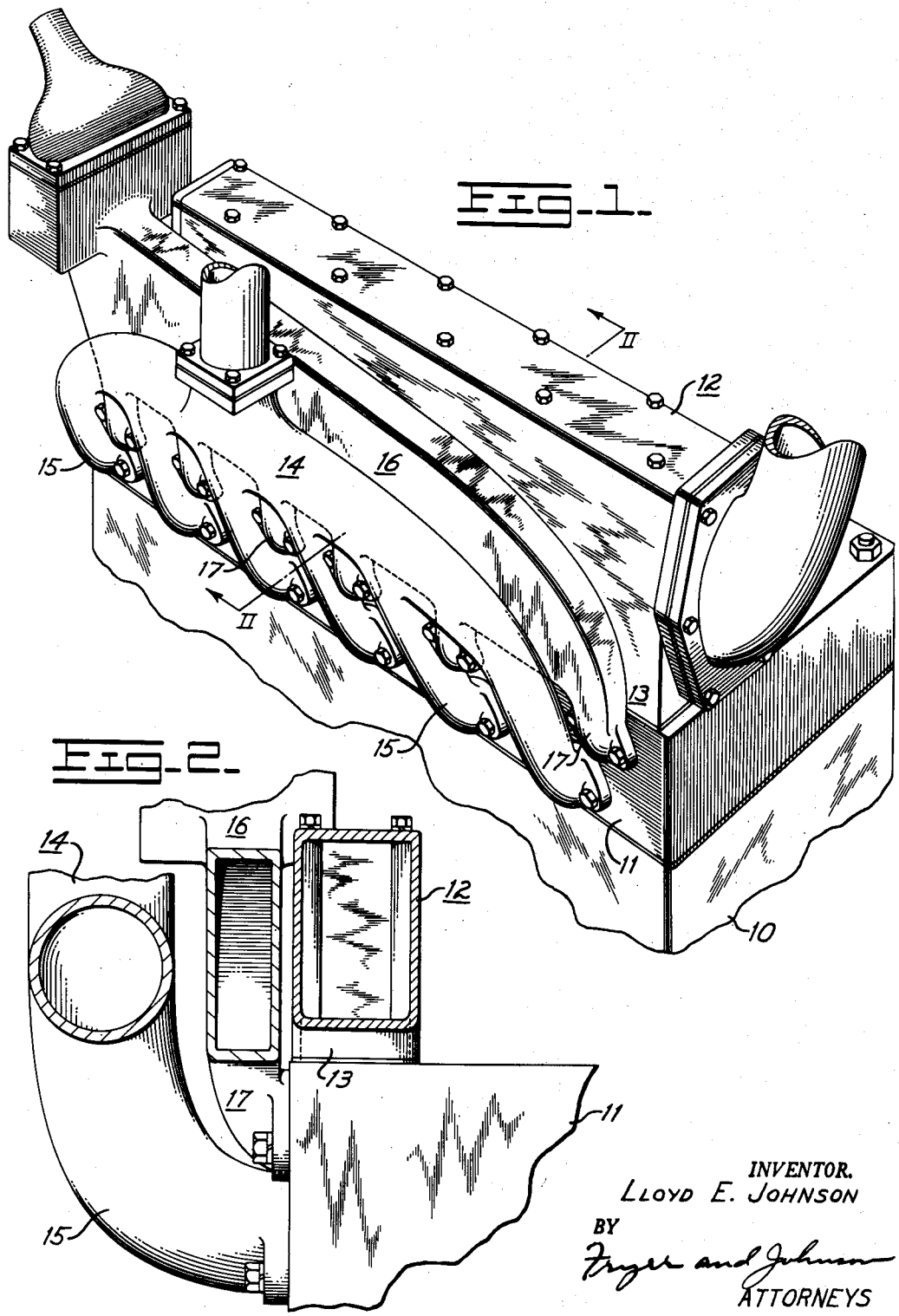
INVENTOR.
LLOYD E. JOHNSON
BY
ATTORNEYS

United States Patent Office

2,716,396
Patented Aug. 30, 1955

2,716,396

ARRANGEMENT OF MANIFOLDS ON INTERNAL COMBUSTION ENGINES

Lloyd E. Johnson, East Peoria, Ill., assignor to Caterpillar Tractor Co., Peoria, Ill., a corporation of California Application March 31, 1954, Serial No. 420,010

2 Claims. (Cl. 123—41.31)

This invention relates to the arrangement of manifolds on internal combustion engines particularly those of the compression ignition type.

In the design of internal combustion engines, it is the usual practice to dispose the intake and the exhaust manifolds on the same side of the engine; and in some types, one of the manifolds is secured to the side face of the cylinder head, while the other manifold joins the engine at the upper face of the head. In compression ignition engines having both the intake and the exhaust manifolds on the same side of the engine, the intake manifold is warmed by heat radiating from the exhaust manifold, especially when the manifolds are in proximity to each other. The air taken into the engine by way of the intake manifold is correspondingly heated which expands this air and lowers the density of the charge entering the combustion chamber. Under these conditions, a smaller amount of oxygen is available to support combustion of the fuel within the engine, and the maximum horsepower which could be developed by the engine is reduced proportionately.

It is also a practice in the manufacture of high output industrial engines to provide another manifold having its several branches connected to the cylinder head at various selected points to carry the coolant from the engine to the radiator during the cycle of circulation of the coolant. This insures a more uniform cooling of the engine. Heretofore, it has been customary to dispose the coolant manifold on a side of the engine opposite to the side where the intake and the exhaust manifolds are placed.

It is the object of this invention to arrange the intake, the exhaust, and the coolant manifolds in such a manner that the coolant manifold will serve as a heat barrier between the intake and the exhaust manifolds, thereby preventing the heating of incoming air and its attendant, undesirable effects.

In the drawings:

Fig. 1 is a perspective view illustrating the manifold arrangement of the present invention;

Fig. 2 is a sectional view taken through the manifolds and the cylinder head on line II—II of Fig. 1, illustrating the location of the manifolds with respect to each other.

In Fig. 1 of the drawings, a portion of a multiple-cylinder engine of the compression ignition type is shown at 10 as having a cylinder head 11 provided with conventional intake and exhaust ports (not shown) for each of the respective cylinders of the engine. An intake manifold 12 secured to the cylinder head communicates with each of the intake ports by means of a multiplicity of branches 13 and supplies air to the combustion chambers within the engine. In like manner, an exhaust manifold 14 communicates with the exhaust ports by means of branches 15 to remove the burned gases.

Disposed between the intake and the exhaust manifolds is a third manifold 16 connected to the cylinder head and provided with branches 17 communicating with outlet ports of the water jacket (not shown) within the cylinder head. This coolant manifold has a dual function. The primary one is to allow an even flow of coolant through the engine and insure uniform cooling of the cylinder head. Being disposed between the intake and the exhaust manifolds, the coolant manifold also serves the additional function of a heat barrier to prevent the intake manifold, and the air passing through it, from being warmed by heat radiating from the exhaust manifold.

Therefore, the intake manifold and the air passing through it to the combustion chambers are approximately the same temperature as the ambient air, and no undesirable rise in temperature and attendant lessening of density of the incoming air will occur with the manifolds disposed in accordance with this invention. Thus, an engine with this type of manifold arrangement is able to produce its maximum rated horsepower and does not have the decrease in volumetric efficiency at high loads which results in compression ignition engines of current design having the intake and the exhaust manifolds disposed adjacent to each other.

I claim:

1. In an internal combustion engine having externally arranged intake and exhaust manifolds, a manifold for coolant disposed between and substantially coextensive in length with the intake and exhaust manifolds, said coolant manifold being formed as a separate part and being separated by air space from both the other manifolds to provide a barrier to reduce heat transfer from the exhaust manifold to the intake manifold.

2. In combination with an internal combustion engine having a cylinder head with intake ports entering its upper portion, exhaust ports in one side and coolant ports in the same side above said exhaust ports, an intake manifold disposed along the top of the cylinder head for communication with the intake ports, an exhaust manifold at substantially the same elevation but spaced from the intake manifold, rising branches communicating between the exhaust ports and the exhaust manifold, and a coolant manifold communicating with said coolant ports and disposed between but spaced from the exhaust and intake manifolds to provide a heat barrier therebetween.

References Cited in the file of this patent

UNITED STATES PATENTS

| | | |
|---|---|---|
| 1,129,605 | Rounds | Feb. 23, 1915 |
| 1,190,252 | Fornaca | July 4, 1916 |
| 1,198,334 | Emerson | Sept. 12, 1916 |
| 1,225,088 | Watts et al. | May 8, 1917 |
| 2,049,596 | Timian | Aug. 4, 1936 |